United States Patent
Tsukamoto

(10) Patent No.: US 9,888,442 B2
(45) Date of Patent: Feb. 6, 2018

(54) ELECTRONIC DEVICE FOR WIRELESSLY RECEIVING POWER FROM POWER SUPPLY APPARATUS

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 130 days.

(21) Appl. No.: 14/733,706

(22) Filed: Jun. 8, 2015

(65) Prior Publication Data

US 2015/0358908 A1  Dec. 10, 2015

(30) Foreign Application Priority Data

Jun. 10, 2014 (JP) .................. 2014-119996

(51) Int. Cl.
| | | |
|---|---|---|
| *H04W 52/02* | (2009.01) | |
| *H04B 5/00* | (2006.01) | |
| *H04W 12/06* | (2009.01) | |
| *G06Q 20/32* | (2012.01) | |
| *H04W 4/00* | (2009.01) | |
| *H02J 7/02* | (2016.01) | |
| *H02J 50/12* | (2016.01) | |

(Continued)

(52) U.S. Cl.
CPC .... *H04W 52/0235* (2013.01); *G06Q 20/3278* (2013.01); *H02J 7/025* (2013.01); *H02J 50/12* (2016.02); *H02J 50/80* (2016.02); *H04B 5/0037* (2013.01); *H04W 4/008* (2013.01); *H04W 12/06* (2013.01); *H02J 2007/0001* (2013.01); *H02J 2007/0096* (2013.01); *H04B 5/0031* (2013.01)

(58) Field of Classification Search
CPC . H04W 52/0235; H04W 12/06; H04W 4/008; H04B 5/0037; G06Q 20/3278
USPC .............. 307/104, 130; 320/106, 108, 137; 370/311; 455/41.1, 411, 558
See application file for complete search history.

(56) References Cited

U.S. PATENT DOCUMENTS 9,717,056 B2 * 7/2017 Tsukamoto ....... H04W 52/0277
2011/0115923 A1 * 5/2011 Moritomo ............... G06F 21/31
348/207.1

(Continued)

FOREIGN PATENT DOCUMENTS

| CN | 102386683 A | 3/2012 |
|---|---|---|
| CN | 102916496 A | 2/2013 |

(Continued)

*Primary Examiner* — Charles C Jiang
*Assistant Examiner* — Wali Butt
(74) *Attorney, Agent, or Firm* — Canon U.S.A., Inc. IP Division

(57) ABSTRACT

An electronic device includes a power receiving unit that wirelessly receives power from a power supply apparatus; a first communication unit that performs wireless communication; a connection unit that connects a communication device including a second communication unit that performs wireless communication; and a control unit that (a) determines whether the communication device is capable of receiving predetermined power if the communication device is connected with the connection unit, and (b) controls the first communication unit to transmit data for notifying the power supply apparatus about a presence of a device which is not capable of using wireless power supply if the communication device is not capable of receiving the predetermined power.

12 Claims, 6 Drawing Sheets

(51) Int. Cl.
*H02J 50/80* (2016.01)
*H02J 7/00* (2006.01)

(56) References Cited

U.S. PATENT DOCUMENTS

| | | |
|---|---|---|
| 2011/0316476 A1 | 12/2011 | Washiro |
| 2012/0040613 A1* | 2/2012 | Nakano ............... H02J 7/025 455/41.1 |
| 2012/0049646 A1* | 3/2012 | Teramoto ............ B60L 11/1814 307/104 |
| 2012/0049791 A1 | 3/2012 | Tanabe |
| 2012/0256495 A1 | 10/2012 | Fukaya |
| 2012/0299389 A1* | 11/2012 | Lee ..................... H04B 5/0031 307/104 |
| 2013/0033235 A1 | 2/2013 | Fukaya |
| 2013/0043835 A1* | 2/2013 | Yoon ................... H04B 5/0037 320/108 |
| 2013/0140906 A1 | 6/2013 | Tanabe |
| 2013/0200843 A1 | 8/2013 | Tanabe |
| 2013/0207602 A1 | 8/2013 | Fukaya |
| 2013/0257364 A1 | 10/2013 | Redding |
| 2013/0314069 A1 | 11/2013 | Suzuki |
| 2013/0342160 A1 | 12/2013 | Tanabe |
| 2015/0054458 A1* | 2/2015 | Yoon ..................... H02J 7/025 320/108 |
| 2015/0091496 A1* | 4/2015 | Meunier ................ H02J 7/025 320/106 |
| 2015/0171930 A1* | 6/2015 | Joehren ................ H04B 5/0037 455/41.1 |

FOREIGN PATENT DOCUMENTS

| | | |
|---|---|---|
| JP | 2008-113519 A | 5/2008 |
| JP | 2012065472 A | 3/2012 |
| RU | 2464632 C2 | 10/2012 |

\* cited by examiner

ELECTRONIC DEVICE FOR WIRELESSLY RECEIVING POWER FROM POWER SUPPLY APPARATUS

BACKGROUND

Field of the Disclosure

Aspects of the present invention relate to an electronic device which receives power wirelessly supplied, and the like.

Description of the Related Art

In recent years, a wireless power supply system, which includes a power supply apparatus wirelessly outputting power without connection by a connector, and an electronic device charging a battery by the power wirelessly supplied from the power supply apparatus, has been used.

Japanese Patent Laid-Open No. 2008-113519 discloses a wireless power supply system in which wireless communication and power transmission are alternately performed between a power supply apparatus and an electronic device.

In such a wireless power supply system, the electronic device includes a communication unit which transmits a response to a command transmitted from the power supply apparatus.

In such a wireless power supply system, the power supply apparatus controls power supply to the electronic device in accordance with a response obtained from the communication unit included in the electronic device.

In recent years, a memory card having a function of performing wireless communication has been used. For example, in a case where such a memory card is inserted into an electronic device, even when the power supply apparatus performs wireless communication required for controlling power supply to the electronic device, the memory card may transmit a response is not associated with wireless power supply to the power supply apparatus. In this case, the power supply apparatus may not appropriately control wireless power supply to the electronic device.

Furthermore, since the power supply apparatus performs wireless power supply to the electronic device, a magnetic field generated in an antenna of the power supply apparatus may affect the memory card inserted into the electronic device, and accordingly, the power supply apparatus may not appropriately perform the wireless power supply to the electronic device.

SUMMARY

According to an aspect of the present invention, even when a communication device capable of performing wireless communication is connected to an electronic apparatus, wireless power supply from a power supply apparatus to the electronic device is appropriately performed.

According to another aspect of the present invention, at least one of the above-described drawbacks and disadvantages can be overcome.

According to another aspect of the present invention, there is provided an electronic device comprising: a power receiving unit that wirelessly receives power from a power supply apparatus; a first communication unit that performs wireless communication; a connection unit that connects a communication device including a second communication unit that performs wireless communication; and a control unit that (a) determines whether the communication device is capable of receiving predetermined power if the communication device is connected with the connection unit, and (b) controls the first communication unit to transmit data for notifying the power supply apparatus about a presence of a device which is not capable of using wireless power supply if the communication device is not capable of receiving the predetermined power.

According to another aspect of the present invention, there is provided a method of controlling an electronic device comprising: determining whether a communication device is capable of receiving predetermined power if the communication device is connected with a connection unit of the electronic device, wherein the electronic device includes a power receiving unit that wirelessly receives power from a power supply apparatus, a first communication unit that performs wireless communication, and the connection unit that connects the communication device including a second communication unit that performs wireless communication; and controlling the first communication unit to transmit data for notifying the power supply apparatus about a presence of a device which is not capable of using wireless power supply if the communication device is not capable of receiving the predetermined power.

According to another aspect of the present invention, there is provided a non-transitory storage medium that stores a program for causing a computer to perform a method of controlling an electronic device, the method comprising: determining whether a communication device is capable of receiving predetermined power if the communication device is connected with a connection unit of the electronic device, wherein the electronic device includes a power receiving unit that wirelessly receives power from a power supply apparatus, a first communication unit that performs wireless communication, and the connection unit that connects the communication device including a second communication unit that performs wireless communication; and controlling the first communication unit to transmit data for notifying the power supply apparatus about a presence of a device which is not capable of using wireless power supply if the communication device is not capable of receiving the predetermined power.

According to another aspect of the present invention, there is provided a power supply apparatus comprising: a power supply unit that wirelessly supplies power to an electronic device; a communication unit that performs wireless communication with the electronic device; and a control unit that performs a process of limiting wireless power supply to the electronic device if the communication unit receives data for notifying the power supply apparatus about a presence of a device which is not capable of using wireless power supply.

According to another aspect of the present invention, there is provided a method of controlling a power supply apparatus comprising: wirelessly supplying power to an electronic device; causing a communication unit to perform wireless communication with the electronic device; and performing a process of limiting wireless power supply to the electronic device if the communication unit receives data for notifying the power supply apparatus about a presence of a device which is not capable of using wireless power supply.

According to another aspect of the present invention, there is provided a non-transitory storage medium that stores a program for causing a computer to perform a method of controlling a power supply apparatus, the method comprising: wirelessly supplying power to an electronic device; causing a communication unit to perform wireless communication with the electronic device; and performing a process of limiting wireless power supply to the electronic device if the communication unit receives data for notifying the power supply apparatus about a presence of a device which is not capable of using wireless power supply.

Further features and aspects of the disclosure will become apparent from the following description of exemplary embodiments.

DESCRIPTION OF THE EMBODIMENTS

Exemplary embodiments, features, and aspects of the present invention will be described below with reference to the drawings. Note that the present invention is not limited to first and second embodiments described below.

First Embodiment

The first embodiment will be described below with reference to the drawings.

Figure 1:
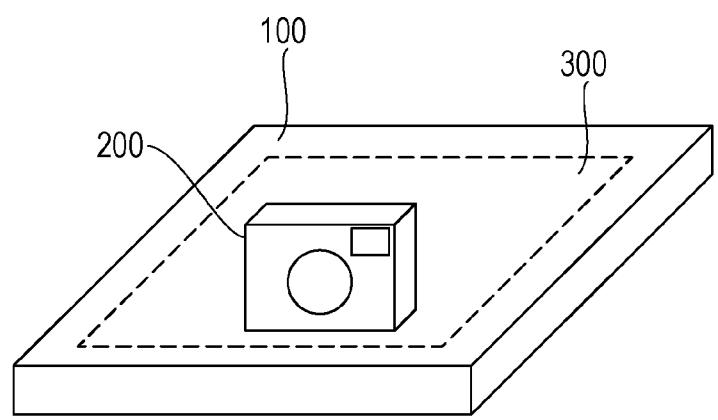
FIG. 1 is a diagram illustrating a power supply system according to first and second embodiments.

As illustrated in FIG. 1, a power supply system according to the first embodiment includes a power supply apparatus 100 and an electronic device 200. In the power supply system according to the first embodiment, when the electronic device 200 is located within a predetermined range 300 in the power supply apparatus 100, the power supply apparatus 100 wirelessly supplies power to the electronic device 200. Furthermore, when the electronic device 200 is located within the predetermined range 300, the electronic device 200 may wirelessly receive power output from the power supply apparatus 100. On the other hand, when the electronic device 200 is not located within the predetermined range 300, the electronic device 200 may not receive power from the power supply apparatus 100. That is, the power supply apparatus 100 is capable of communicating with the electronic device 200 within the predetermined range 300. Although the predetermined range 300 is positioned on a housing of the power supply apparatus 100 here, the first embodiment is not limited to this. The power supply apparatus 100 may wirelessly supply power to electronic devices.

The electronic device 200 may be an image pickup apparatus or a reproducing apparatus, and furthermore, may be a mobile apparatus, such as a cellular phone or a smart phone. Furthermore, the electronic device 200 may be a battery pack including a battery. Moreover, the electronic device 200 may be a vehicle, a display, or a personal computer.

Power Supply Apparatus 100

Figure 2:
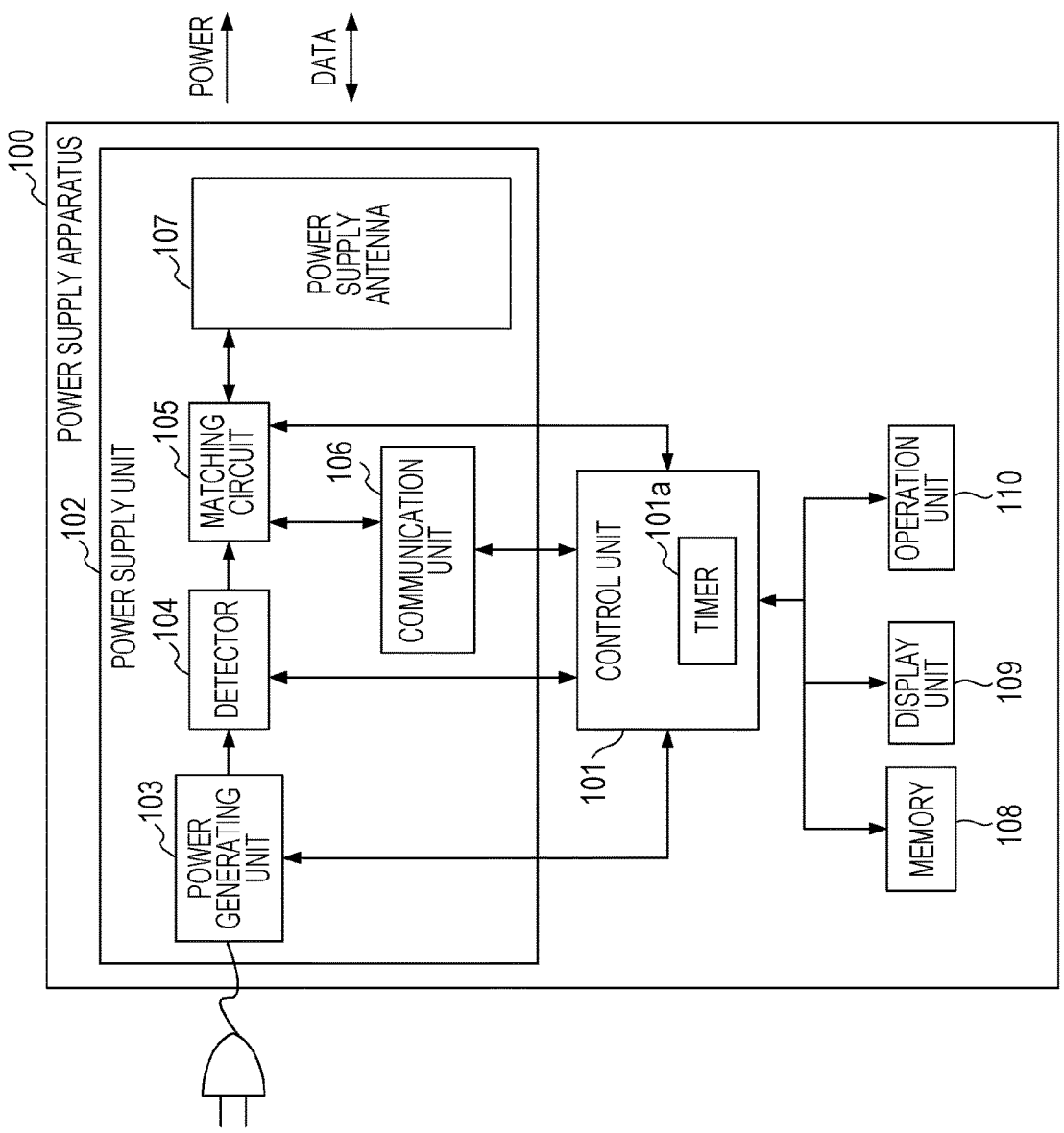
FIG. 2 is a block diagram illustrating a power supply apparatus 100 according to the first and second embodiments.

A configuration of the power supply apparatus 100 according to the first embodiment will now be described with reference to FIG. 2. The power supply apparatus 100 includes a control unit 101, a power supply unit 102, a memory 108, a display unit 109, and an operation unit 110 as illustrated in FIG. 2. The power supply unit 102 includes a power generating unit 103, a detector 104, a matching circuit 105, a communication unit 106, and a power supply antenna 107.

The control unit 101 controls the power supply apparatus 100 by executing a computer program recorded in the memory 108. The control unit 101 includes a CPU (Central Processing Unit) or an MPU (Micro Processing Unit), for example. Note that the control unit 101 is constituted by hardware. The control unit 101 includes a timer 101a.

The power supply unit 102 is used to perform a wireless power supply in accordance with a magnetic field resonance method. In the magnetic field resonance method, the power supply apparatus 100 transmits power to the electronic device 200 in a state in which the power supply apparatus 100 and the electronic device 200 resonate with each other. In the state in which the power supply apparatus 100 and the electronic device 200 resonate with each other, a resonance frequency of the power supply antenna 107 of the power supply apparatus 100 coincides with a resonance frequency of a power receiving antenna 203 of the electronic device 200.

The power generating unit 103 generates power used to externally output through the power supply antenna 107, using power supplied from an AC power source or a battery connected to the power supply apparatus 100.

The power generated by the power generating unit 103 includes communication power and supplying power. The communication power is used for communication between the communication unit 106 and the electronic device 200. The communication power is weak power which is not larger than 1 W, for example. The communication power may be prescribed by a communication standard of the communication unit 106. The supplying power is used by the electronic device 200 to perform charging or a specific operation. The supplying power is not less than 2 W, for example. Furthermore, the supplying power is not limited to the power of 2 W or more as long as the supplying power is larger than the communication power. A value of the supplying power is set by the control unit 101 in accordance with data obtained from the electronic device 200. For example, the value of the supplying power is set by the control unit 101 in accordance with at least one of authentication data and status data which are obtained from the electronic device 200. The supplying power is used by the electronic device 200 to charge a battery 211, for example.

The power generated by the power generating unit 103 is supplied through the detector 104 and the matching circuit 105 to the power supply antenna 107.

The detector 104 detects a VSWR (Voltage Standing Wave Ratio) to detect a state of resonance between the power supply apparatus 100 and the electronic device 200. Furthermore, the detector 104 supplies data indicating the detected VSWR to the control unit 101. The VSWR is a value indicating the relationship between a traveling wave of power output from the power supply antenna 107 and a reflection wave of the power output from the power supply antenna 107. The control unit 101 may detect change of the state of the resonance between the power supply apparatus 100 and the electronic device 200 and a foreign object, using data on the VSWR supplied from the detector 104.

The matching circuit 105 includes a circuit which sets a resonance frequency of the power supply antenna 107 and a circuit which performs impedance matching between the power generating unit 103 and the power supply antenna 107.

When the power supply apparatus 100 outputs one of the communication power and the supplying power through the power supply antenna 107, the control unit 101 controls the matching circuit 105 such that the resonance frequency of the power supply antenna 107 is set to a predetermined frequency f. The predetermined frequency f is 13.56 MHz, for example. Furthermore, the predetermined frequency f may be 6.78 MHz or a frequency prescribed by the communication standard of the communication unit 106.

The communication unit 106 performs wireless communication in accordance with NFC (Near Field Communication) standard, for example. When the communication power is output from the power supply antenna 107, the communication unit 106 may perform transmission and reception of data to perform wireless power supply with the electronic device 200 through the power supply antenna 107. However, in a period of time in which the supplying power is output from the power supply antenna 107, the communication unit 106 does not communicate with the electronic device 200 through the power supply antenna 107.

When the communication unit 106 transmits data to the electronic device 200, the communication unit 106 performs a process of superimposing data on the communication power supplied from the power generating unit 103. The communication power on which the data is superimposed is transmitted to the electronic device 200 through the power supply antenna 107.

When the communication unit 106 receives data from the electronic device 200, the communication unit 106 detects current supplied in the power supply antenna 107 and receives the data from the electronic device 200 in accordance with a result of the detection of the current. This is because the electronic device 200 transmits data to the power supply apparatus 100 by performing load modulation. When the electronic device 200 performs the load modulation, current supplied in the power supply antenna 107 is changed, and accordingly, the communication unit 106 may receive the data from the electronic device 200 by detecting the current supplied in the power supply antenna 107.

The data transmitted and received between the communication unit 106 and the electronic device 200 conforms to an NDEF (NFC Data Exchange Format).

Note that the communication unit 106 operates as a reader/writer prescribed by the NFC standard.

The power supply antenna 107 outputs one of the communication power and the supplying power to the electronic device 200. The power supply antenna 107 is used by the communication unit 106 to perform wireless communication with the electronic device 200 in accordance with the NFC standard.

The memory 108 records a computer program used to control the power supply apparatus 100. The memory 108 further records identification data of the power supply apparatus 100, a power supply parameter of the power supply apparatus 100, a flag for controlling power supply, and the like. In addition, the memory 108 records data obtained by the communication unit 106 from the electronic device 200.

The display unit 109 displays image data supplied from the memory 108.

The operation unit 110 provides a user interface used to operate the power supply apparatus 100. The control unit 101 controls the power supply apparatus 100 in accordance with a signal input through the operation unit 110.

The power supply apparatus 100 supplies power to the electronic device 200 in a wireless manner. However, in the first embodiment and the other embodiments, a term "wireless" may be replaced by a term "contactless" or "non-contact."

Electronic Device 200

Figure 3:
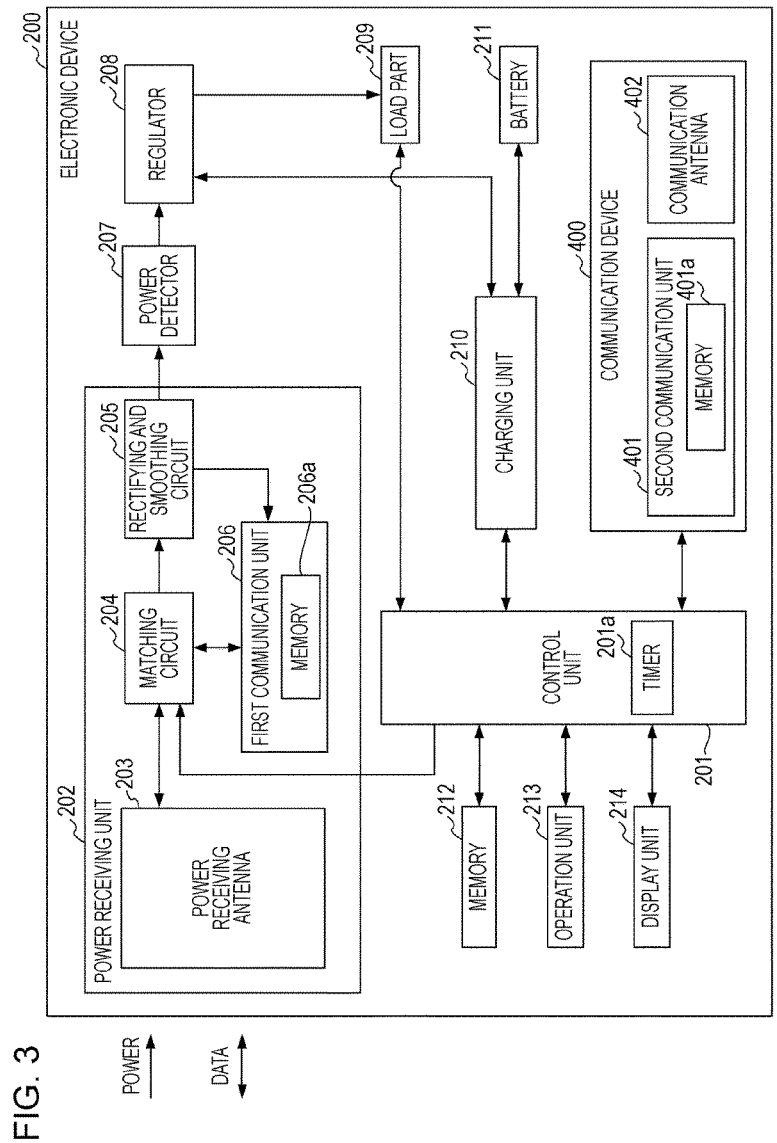
FIG. 3 is a block diagram illustrating an electronic device 200 according to the first and second embodiments.

Next, a configuration of the electronic device 200 will be described with reference to FIG. 3. The electronic device 200 includes a control unit 201, a power receiving unit 202, a power detector 207, a regulator 208, a load unit 209, a charging unit 210, the battery 211, a memory 212, an operation unit 213, a display unit 214, and a communication device 400. The power receiving unit 202 includes the power receiving antenna 203, a matching circuit 204, a rectifying and smoothing circuit 205, and a first communication unit 206.

The control unit 201 controls the electronic device 200 by executing a computer program recorded in the memory 212. The control unit 201 includes a CPU or an MPU, for example. The control unit 201 is constituted by hardware. The control unit 201 includes a timer 201a.

The power receiving unit 202 is used to wirelessly receive power from the power supply apparatus 100 in accordance with the magnetic field resonance method.

The power receiving antenna 203 receives power supplied from the power supply apparatus 100. Furthermore, the power receiving antenna 203 is used by the first communication unit 206 to perform wireless communication in accordance with the NFC standard. The power received by the power receiving antenna 203 of the electronic device 200 from the power supply apparatus 100 is further supplied through the matching circuit 204 to the rectifying and smoothing circuit 205.

The matching circuit 204 includes a circuit which sets a resonance frequency of the power receiving antenna 203. The control unit 201 may set the resonance frequency of the power receiving antenna 203 by controlling the matching circuit 204.

The rectifying and smoothing circuit 205 generates direct-current power from the power received by the power receiving antenna 203. Furthermore, the rectifying and smoothing circuit 205 supplies the generated direct-current power through the power detector 207 to the regulator 208. If data is superimposed on the power received by the power receiving antenna 203, the data which is extracted from the power received by the power receiving antenna 203 is supplied to the first communication unit 206.

The first communication unit 206 communicates with the power supply apparatus 100 in accordance with the communication standard employed in the communication unit 106. The first communication unit 206 includes a memory 206a. The memory 206a records RTD (Record Type Definition) data for WPT (Wireless Power Transfer). The RTD data for the WPT includes data items correspond to the NDEF. The RTD data for the WPT stores data required for performing wireless power supply between the power supply apparatus 100 and the electronic device 200.

The RTD data for the WPT at least stores authentication data used to perform authentication of wireless power supply with the power supply apparatus 100. The authentication data includes a record type name, a power supply method which may be employed by the electronic device 200, data indicating a control protocol for the power supply, identification data of the electronic device 200, power receiving capability data of the electronic device 200, and data indicating a type of a tag included in the electronic device 200. The record type name is data indicating a record type for identifying content and a configuration of data stored in the RTD data for the WPT. The record type name is data for identifying the RTD data for the WPT. The power receiving capability data represents power receiving capability of the electronic device 200, and represents a maximum value of power which may be received by the electronic device 200, for example.

The RTD data for the WPT may further store status data. The status data includes data indicating a status of the electronic device 200. The status data includes, for example, a value of power requested to the power supply apparatus 100, a value of power received by the electronic device 200 from the power supply apparatus 100, data indicating a remaining capacity of the battery 211 and charge of the battery 211, and error data relating to an error of the electronic device 200.

The first communication unit 206 analyzes the data supplied from the rectifying and smoothing circuit 205. Thereafter, the first communication unit 206 transmits data read from the RTD data for the WPT to the power supply apparatus 100, using a result of the analysis of the data, and writes data received from the power supply apparatus 100 in the RTD data for the WPT. Furthermore, the first communication unit 206 transmits response data in response to the data supplied from the rectifying and smoothing circuit 205 to the power supply apparatus 100.

The first communication unit 206 performs load modulation to transmit the data read from the RTD data for the WPT and the response data to the power supply apparatus 100.

Note that the first communication unit 206 functions as a tag prescribed by the NFC standard.

The power detector 207 detects received power which is received through the power receiving antenna 203 and supplies data indicating the detected power to the control unit 201.

The regulator 208 supplies at least one of the power supplied from the rectifying and smoothing circuit 205 and the power supplied from the battery 211 to the units included in the electronic device 200 in response to an instruction issued by the control unit 201.

The load unit 209 includes an image capture unit which generates image data of a still image or a moving image from an optical image of an object, a reproducing unit which reproduces image data, and the like.

The charging unit 210 charges the battery 211. In response to an instruction issued by the control unit 201, the charging unit 210 determines whether to charge the battery 211 using the power supplied from the regulator 208 or to supply power discharged from the battery 211 to the regulator 208. The charging unit 210 periodically detects a remaining capacity of the battery 211, and supplies data on the remaining capacity of the battery 211 and data on charging of the battery 211 to the control unit 201.

The battery 211 is connectable to the electronic device 200. Furthermore, the battery 211 is a chargeable secondary battery, such as a lithium ion battery. The battery 211 may be a battery other than a lithium ion battery.

The memory 212 stores the computer program for controlling the electronic device 200, data on parameters of the electronic device 200, and other data.

The operation unit 213 provides a user interface used to operate the electronic device 200. The control unit 201 controls the electronic device 200 in accordance with a signal input through the operation unit 213.

The display unit 214 displays image data in response to an instruction issued by the control unit 201.

The communication device 400 includes a second communication unit 401 and a communication antenna 402. For example, the communication device 400 is a device capable of performing communication based on the NFC standard, such as an SD card or a SIM card (Subscriber Identity Module Card). In other words, the communication device 400 is capable of acting as at least one of a memory card or a SIM (Subscriber Identity Module) card. The communication device 400 may perform an electronic payment between an apparatus operating as a reader/writer and the communication device 400, for example, using the second communication unit 401 and the communication antenna 402. Furthermore, the communication device 400 may perform authentication for a wireless LAN (Local Area Network) or Bluetooth with an apparatus operating as a reader/writer using the second communication unit 401 and the communication antenna 402. Note that the communication device 400 may be a device incorporated in the electronic device 200 or an external device which is detachable from the electronic device 200. The electronic device 200 includes a connection interface used for connecting between the communication device 400 and the electronic device 200.

As with the first communication unit 206, the second communication unit 401 performs wireless communication through the communication antenna 402 in accordance with the NFC standard. The second communication unit 401 conforms to a communication protocol the same as a communication protocol of the first communication unit 206. Note that the second communication unit 401 is capable of acting as a tag determined by the NFC standard.

The second communication unit 401 includes a memory 401a. The memory 401a records RTD data corresponding to a function of the communication device 400. The control unit 201 may read data from the memory 401a and write data to the memory 401a. When the communication device 400 and the control unit 201 are connected to each other through the connection interface the control unit 201 may read data from the memory 401a through the connection interface and write data to the memory 401a through the connection interface.

The second communication unit 401 may record data obtained from the reader/writer in the memory 401a and transmit data read from the memory 401a to the reader/writer.

Furthermore, the control unit 201 may control the second communication unit 401.

The communication antenna 402 is used by the second communication unit 401 to perform wireless communication in accordance with the NFC standard.

Power Supply Process

Figure 4:
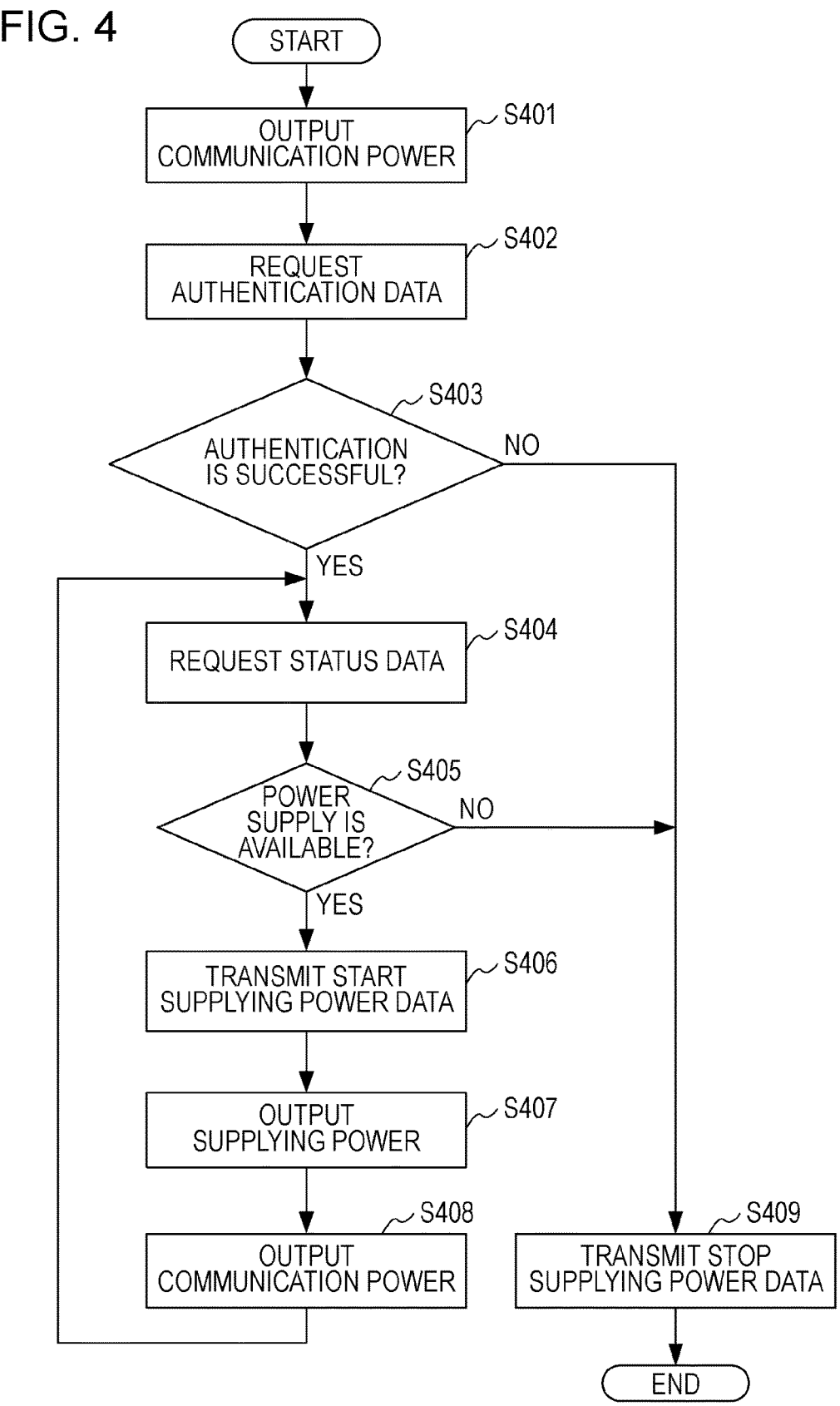
FIG. 4 is a flowchart illustrating a power supply process performed by the power supply apparatus 100 according to the first and second embodiments.

Next, a power supply process performed by the power supply apparatus 100 will be described with reference to a flowchart illustrated in FIG. 4. The power supply process illustrated in FIG. 4 may be realized when the control unit 101 executes the computer program stored in the memory 108.

In step S401, the control unit 101 controls the power supply unit 102 so that the communication power is output through the power supply antenna 107. Thereafter, the flowchart proceeds to step S402.

In step S402, the control unit 101 controls the communication unit 106 so that data for requesting authentication data required for starting wireless power supply is transmitted. Thereafter, the flowchart proceeds to step S403.

In step S403, the control unit 101 determines whether authentication of the electronic device 200 is successfully performed. The control unit 101 determines whether the electronic device 200 is capable of using the wireless power supply of the power supply apparatus 100, using the authentication data received by the communication unit 106 from the electronic device 200. If the electronic device 200 is capable of using the wireless power supply of the power supply apparatus 100, the control unit 101 determines that the authentication of the electronic device 200 is successfully performed (YES in step S403), and the flowchart proceeds to step S404. If the electronic device 200 is not capable of using the wireless power supply of the power supply apparatus 100, the control unit 101 determines that the authentication of the electronic device 200 fails (NO in step S403), and the flowchart proceeds to step S409. If the authentication data is not received by the communication unit 106 from the electronic device 200, the control unit 101 also determines that the authentication of the electronic device 200 fails and the flowchart proceeds to step S409.

In step S404, the control unit 101 controls the communication unit 106 so that data for requesting status data is transmitted. Thereafter, the flowchart proceeds to step S405.

In step S405, the control unit 101 determines whether power may be supplied to the electronic device 200, using the status data received by the communication unit 106 from the electronic device 200. If it is determined that the battery 211 is fully charged in accordance with the status data, for example, the control unit 101 determines that power may not be supplied to the electronic device 200. On the other hand, it is determined that the battery 211 does not fully charge in accordance with the status data, the control unit 101 determines that power may be supplied to the electronic device 200.

Furthermore, if it is detected that power supply is not requested by the electronic device 200 to the power supply apparatus 100 in accordance with the status data, for example, the control unit 101 determines that power may not be supplied to the electronic device 200. On the other hand, if it is detected that power supply is requested by the electronic device 200 to the power supply apparatus 100 in accordance with the status data, the control unit 101 determines that power may be supplied to the electronic device 200.

If the control unit 101 determines that power may be supplied to the electronic device 200 (YES in step S405), the flowchart proceeds to step S406. If the control unit 101 determines that power may not be supplied to the electronic device 200 (NO in step S405), the flowchart proceeds to step S409. If the control unit 101 also determines that the status data is not received by the communication unit 106 from the electronic device 200, the flowchart proceeds to step S409.

In step S406, the control unit 101 controls the communication unit 106 so that start supplying power data for notifying the electronic device 200 of starting supplying power is transmitted. Thereafter, the flowchart proceeds to step S407.

In step S407, the control unit 101 controls the power supply unit 102 so that the supplying power is output through the power supply antenna 107 for a predetermined period of time. If the predetermined period of time is elapsed after supply of the supplying power is started, the flowchart proceeds to step S408.

In step S408, the control unit 101 controls the power supply unit 102 so that the communication power is output through the power supply antenna 107 similarly to the process in step S401. Thereafter, the flowchart returns to step S404.

In step S409, the control unit 101 controls the communication unit 106 so that stop supplying power data for notifying the electronic device 200 of stopping supplying power is transmitted. Furthermore, the control unit 101 controls the power supply unit 102 so that the output of the power through the power supply antenna 107 is stopped. Thereafter, the flowchart is terminated.

Power Receiving Process

Figure 5:
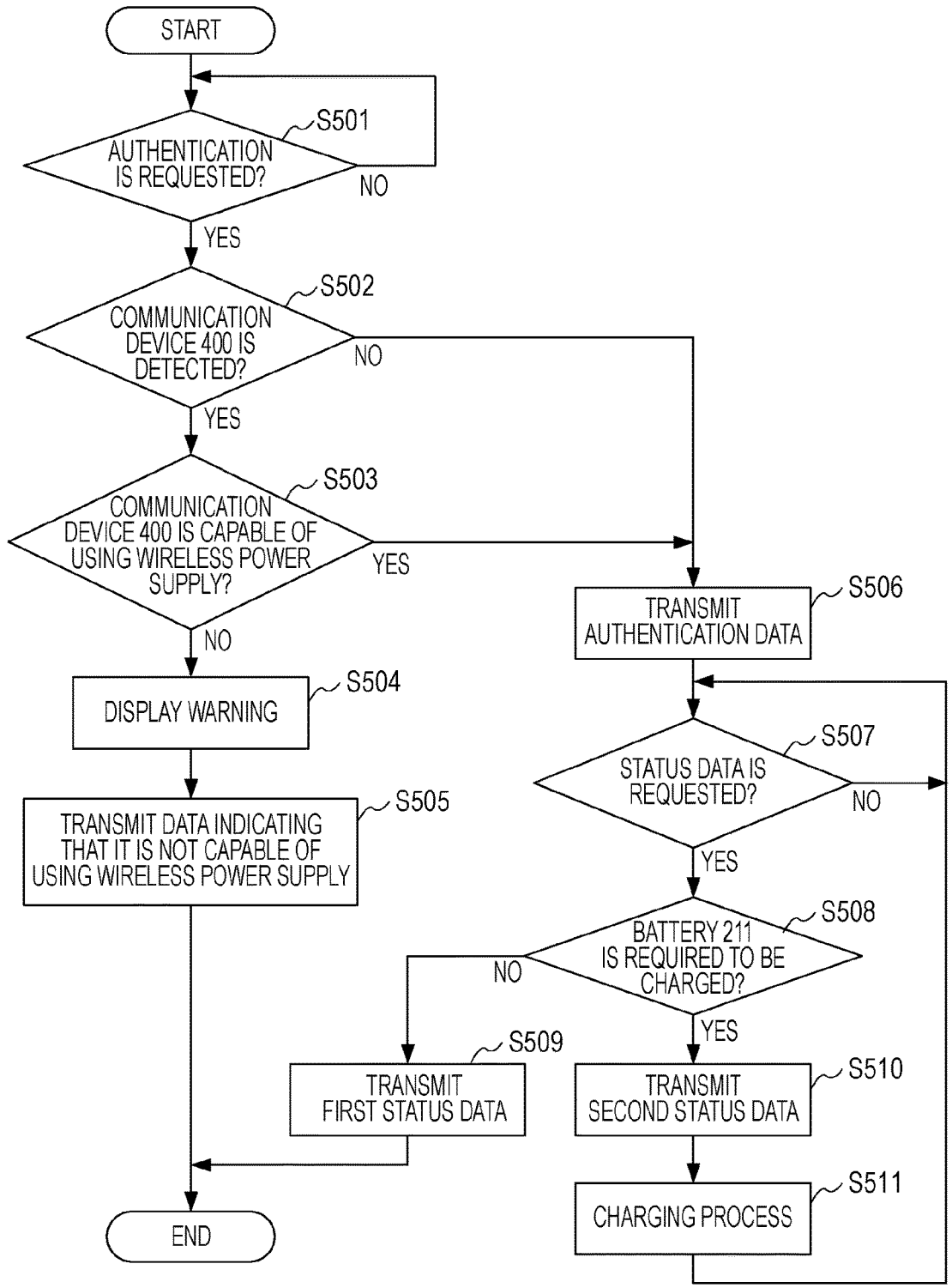
FIG. 5 is a flowchart illustrating a power receiving process performed by the electronic device 200 according to the first embodiment.

Next, a power receiving process performed by the electronic device 200 will be described with reference to a flowchart illustrated in FIG. 5. The power receiving process illustrated in FIG. 5 may be realized when the control unit 201 executes the computer program stored in the memory 212.

In step S501, the control unit 201 determines whether data for requesting authentication data from the power supply apparatus 100 is received by the first communication unit 206. If the data for requesting authentication data is received by the first communication unit 206 (YES in step S501), the flowchart proceeds to step S502. If the data for requesting the authentication data is not received by the first communication unit 206 (NO in step S501), the flowchart returns to step S501.

In step S502, the control unit 201 determines whether the communication device 400 is detected. For example, the control unit 201 performs a process of reading out data from the memory 401a. Thereafter, the control unit 201 detects the communication device 400 in accordance with whether data is read out from the memory 401a. If data is read out from the memory 401a, the control unit 201 determines that the electronic device 200 is connected with the communication device 400, and determines that the communication device 400 is detected (YES in step S502). In this case (YES in step S502), the flowchart proceeds to step S503. If data is not read out from the memory 401a, the control unit 201 determines that the electronic device 200 is not connected with the communication device 400, and determines that the communication device 400 is not detected (NO in step S502). In this case (NO in step S502), the flowchart proceeds to step S506.

In step S503, the control unit 201 determines whether the communication device 400 is capable of using wireless power supply in accordance with the data read out from the memory 401a in step S502. If the communication device 400 is capable of using wireless power supply (YES in step S503), the flowchart proceeds to step S506. If the communication device 400 is not capable of using wireless power supply (NO in step S503), the flowchart proceeds to step S504.

Alternatively, in step S503, the control unit 201 may determine whether RTD data recorded in the memory 401a is capable of using wireless power supply. In this case, if the RTD data recorded in the memory 401a is capable of using wireless power supply, the control unit 201 determines that the communication device 400 is capable of using wireless power supply. If the RTD data recorded in the memory 401a is not capable of using wireless power supply, the control unit 201 determines that the communication device 400 is not capable of using wireless power supply.

Still alternatively, in step S503, the control unit 201 may determine whether the communication device 400 is capable of using wireless power supply by determining whether or not the communication device 400 may receive supplying power, which is a predetermined power higher than the communication power. In this case, if the data recorded in the memory 401a indicates that the communication device 400 may receive the supplying power, the control unit 201 determines that the communication device 400 is capable of using wireless power supply. Furthermore, in this case, if the data recorded in the memory 401a indicates that the communication device 400 may not receive the supplying power, the control unit 201 determines that the communication device 400 is not capable of using wireless power supply. If the data recorded in the memory 401a indicates that the communication device 400 may receive the communication power but may not receive the supplying power, the control unit 201 determines that the communication device 400 is not capable of using wireless power supply.

In step S504, the control unit 201 controls the display unit 214 to display warning data for notifying a user that wireless power supply from the power supply apparatus 100 to the electronic device 200 may not be started, and about the presence of the communication device 400. If the communication device 400 is an external device detachably attached to the electronic device 200, in step S504, the control unit 201 may control the display unit 214 to further display warning data for urging a user to remove the communication device 400 from the electronic device 200. If the warning data is displayed, the flowchart proceeds to step S505.

In step S505, the control unit 201 controls the first communication unit 206 to transmit data including data indicating that the electronic device 200 is not capable of using wireless power supply and the presence of the communication device 400, in response to the data received from the power supply apparatus 100 in step S501. Thereafter, the flowchart is terminated.

If the power supply apparatus 100 receives data transmitted from the first communication unit 206 to the power supply apparatus 100 in step S505, it is determined that the authentication with the electronic device 200 is failed (NO in step S403). Thereafter, the power supply apparatus 100 controls the power supply unit 102 not to output the supplying power.

In step S506, the control unit 201 controls the first communication unit 206 to transmit authentication data in response to the data received from the power supply apparatus 100 in step S501. In this case, the authentication data read out from the RTD data for WPT of the memory 206a is transmitted by the first communication unit 206. Thereafter, the flowchart proceeds to step S507.

If the power supply apparatus 100 receives data transmitted from the first communication unit 206 to the power supply apparatus 100 in step S506, it is determined that the authentication with the electronic device 200 is successful (YES in step S403).

In step S507, the control unit 201 determines whether data for requesting status data is received by the first communication unit 206 from the power supply apparatus 100. If the first communication unit 206 receives the data for requesting the status data (YES in step S507), the flowchart proceeds to step S508. If the first communication unit 206 does not receive the data for requesting the status data (NO in step S507), the flowchart returns to step S507.

In step S508, the control unit 201 determines whether the battery 211 is required to be charged. For example, the control unit 201 detects the remaining capacity of the battery 211 from data supplied from the charging unit 210, and determines whether the remaining capacity of the battery 211 is a predetermined value or more. If the remaining capacity of the battery 211 is the predetermined value or more, the control unit 201 determines that the battery 211 is not required to be charged (NO in step S508), and the flowchart proceeds to step S509. If the remaining capacity of the battery 211 is not the predetermined value or more, the control unit 201 determines that the battery 211 is required to be charged (YES in step S508), and the flowchart proceeds to step S510. The predetermined value may be a threshold for determining whether the battery 211 is fully charged, or may be a value corresponding to 50% to 80% of the total capacity of the battery 211. Alternatively, the predetermined value may be a threshold for determining whether the battery 211 may supply required power to the load part 209.

In step S509, the control unit 201 controls the first communication unit 206 to transmit first status data in response to the data received from the power supply apparatus 100 in step S507. The first status data is data for causing the power supply apparatus 100 to determine that power supply is not available for the electronic device 200. For example, the first status data includes at least one of data indicating that there is no required power requested to the power supply apparatus 100 and data indicating that the battery 211 is fully charged. Thereafter, the flowchart is terminated.

If the power supply apparatus 100 receives the first status data transmitted from the first communication unit 206 to the power supply apparatus 100 in step S509, it is determined that power supply to the electronic device 200 is not available (NO in step S405). Thereafter, the power supply apparatus 100 controls the power supply unit 102 not to output the supplying power.

In step S510, the control unit 101 controls the first communication unit 206 to transmit second status data in response to the data received from the power supply apparatus 100 in step S507. The second status data is data for causing the power supply apparatus 100 to determine that power supply is available for the electronic device 200. Thereafter, the flowchart proceeds to step S511.

If the power supply apparatus 100 receives the second status data transmitted from the first communication unit 206 to the power supply apparatus 100 in step S510, it is determined that power supply to the electronic device 200 is available (YES in step S405). Thereafter, the power supply apparatus 100 controls the power supply unit 102 to output the supplying power.

In step S511, the control unit 201 controls the charging unit 210 to charge the battery 211 using power supplied from the regulator 208 to the charging unit 210. The control unit 201 may activate the load part 209 using power supplied from the regulator 208. Thereafter, the flowchart returns to step S507.

As described above, if the electronic device 200 according to the first embodiment is connected with the communication device 400 not capable of using wireless power supply, the electronic device 200 transmits data indicating that the electronic device 200 is not capable of using wireless power supply, so that authentication for performing wireless power supply with the power supply apparatus 100 is failed. Accordingly, while the electronic device 200 is connected with the communication device 400 not capable of using wireless power supply, the electronic device 200 may control the power supply apparatus 100 not to supply the supplying power to the electronic device 200 or the communication device 400.

Furthermore, since the electronic device 200 notifies the power supply apparatus 100 and the user about the presence of the communication device 400 not capable of using wireless power supply, the power supply apparatus 100 and the user may recognize the reason why the supply of the supplying power to the electronic device 200 may not be started.

Accordingly, even if the communication device 400 is connected with the electronic device 200, the electronic device 200 may cause wireless power supply to be properly performed from the power supply apparatus 100 to the electronic device 200.

In step S501, the control unit 201 determines whether data for requesting the authentication data is received by the first communication unit 206. However, if it is determined that the communication device 400 is not detected (NO in step S502), the control unit 201 may perform the process in step S501 and then perform the process in step S506. Alternatively, if it is determined that the communication device 400 is capable of using wireless power supply (YES in step S503), the control unit 201 may perform the process in step S501 and then perform the process in step S506.

In step S504, the control unit 201 controls the display unit 214 to display the warning data. However, it is not limited thereto. For example, in step S504, the control unit 201 may notify the user about that wireless power supply from the power supply apparatus 100 to the electronic device 200 may not be started and the presence of the communication device 400, by lighting an LED inserted into the electronic device 200. If the communication device 400 is an external device detachably attached to the electronic device 200, in step S504, the control unit 201 may notify the user to remove the communication device 400 from the electronic device 200 by lighting an LED inserted into the electronic device 200.

Furthermore, for example, in step S504, the control unit 201 may display warning data on an external display connected with the electronic device 200, for notifying a user that that wireless power supply from the power supply apparatus 100 to the electronic device 200 may not be started and the presence of the communication device 400. If the communication device 400 is an external device detachably attached to the electronic device 200, the control unit 201 may cause the external display connected with the electronic device 200 to display warning data to remove the communication device 400 from the electronic device 200.

In step S505, the control unit 201 transmits data including the data indicating that the electronic device 200 is not capable of using wireless power supply and the presence of the communication device 400. However, it is not limited thereto. The data to be transmitted to the power supply apparatus 100 from the first communication unit 206 in step S505 may be any data as long as the data controls the power supply apparatus 100 not to output the supplying power. Hence, for example, in step S505, the control unit 201 may transmit data for notifying the presence of a foreign object as the data indicating the presence of the communication device 400 not capable of using wireless power supply.

Therefore, for example, in step S505, the control unit 201 may control the first communication unit 206 to transmit data indicating occurrence of an error relating to wireless power supply to the power supply apparatus 100.

Alternatively, for example, in step S505, the control unit 201 may control the first communication unit 206 to transmit at least one of the data indicating that the electronic device 200 is not capable of using wireless power supply and the data indicating the presence of the communication device 400.

Alternatively, for example, in step S505, the control unit 201 may control the first communication unit 206 not to transmit response data in response to the data received from the power supply apparatus 100 in step S501, to the power supply apparatus 100. In this case, the data including the data indicating that the electronic device 200 is not capable of using wireless power supply and the presence of the communication device 400 is not transmitted from the first communication unit 206 to the power supply apparatus 100. Owing to this, since the power supply apparatus 100 may not receive the authentication data from the electronic device 200, it is determined that the authentication with the electronic device 200 is failed (NO in step S403). Thereafter, the power supply apparatus 100 controls the power supply unit 102 not to output the supplying power. Accordingly, while the electronic device 200 is connected with the communication device 400 not capable of using wireless power supply, the electronic device 200 may control the power supply apparatus 100 not to supply the supplying power to the electronic device 200.

Second Embodiment

In the second embodiment, descriptions of processes and configurations the same as those of the first embodiment are omitted, and processes and configurations different from the first embodiment will be described.

In the first embodiment, when the communication device 400 which is not capable of using wireless power supply is connected with the electronic device 200, if authentication data is requested from the power supply apparatus 100, data for controlling the power supply apparatus 100 not to perform wireless power supply is transmitted.

In contrast, in the electronic device 200 according to the second embodiment, when the communication device 400 which is not capable of using wireless power supply is connected with the electronic device 200, if status data is requested from the power supply apparatus 100, data for controlling the power supply apparatus 100 not to perform wireless power supply is transmitted.

Power Receiving Process

Figure 6:
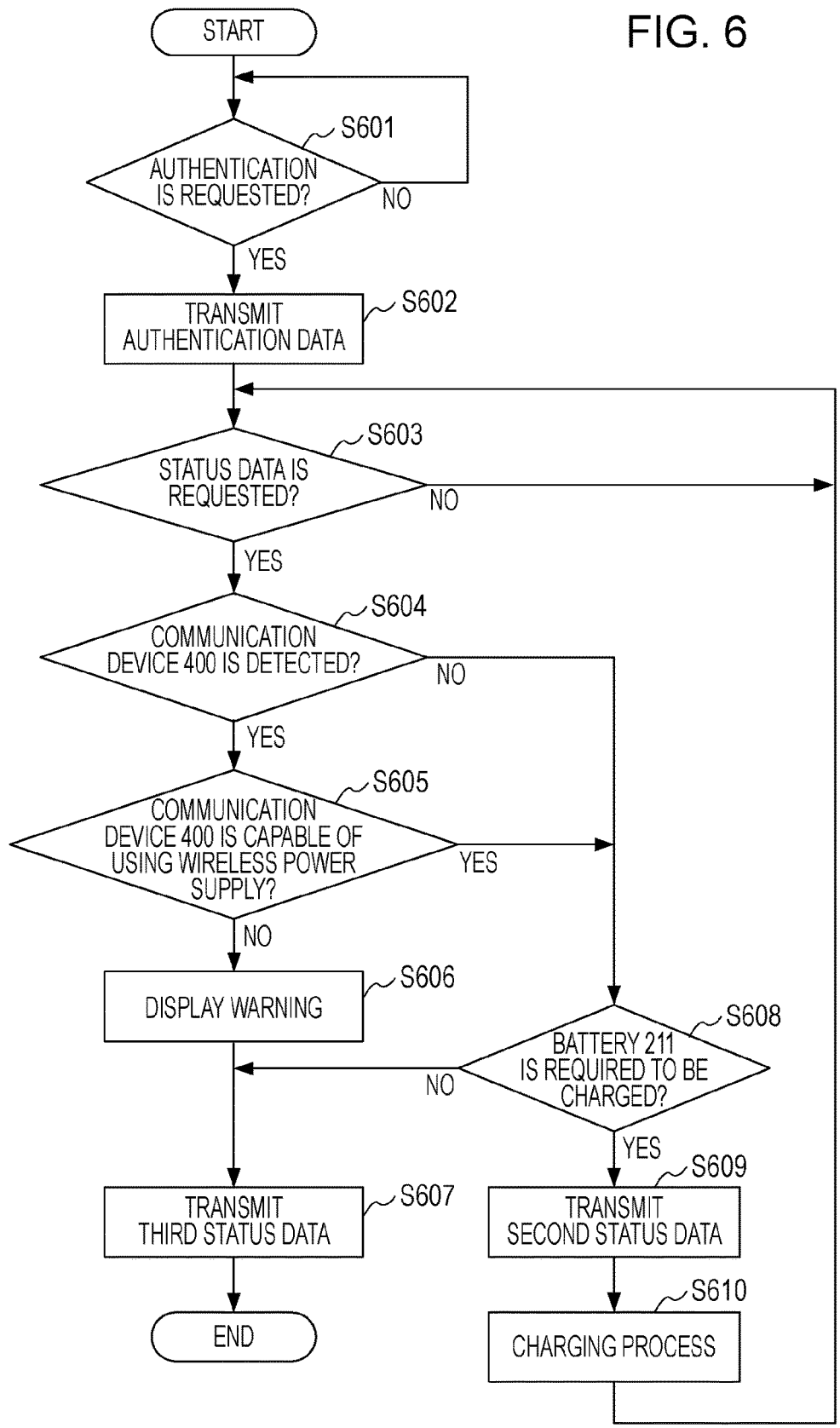
FIG. 6 is a flowchart illustrating a power receiving process performed by the electronic device 200 according to the second embodiment.

Next, a power receiving process performed by the electronic device 200 will be described with reference to a flowchart illustrated in FIG. 6. The power receiving process illustrated in FIG. 6 may be realized when the control unit 201 executes a computer program stored in the memory 212.

In step S601, the control unit 201 determines whether data for requesting authentication data from the power supply apparatus 100 is received by the first communication unit 206 from the power supply apparatus 100 similarly to the process in step S501. If the data for requesting the authentication data is received by the first communication unit 206 (YES in step S601), the flowchart proceeds to step S602. If the data for requesting the authentication data is not received by the first communication unit 206 (NO in step S601), the flowchart returns to step S601.

In step S602, the control unit 201 controls the first communication unit 206 to transmit the authentication data in response to the data received from the power supply apparatus 100 in step S601 similarly to the process in step S506. Thereafter, the flowchart proceeds to step S603.

In step S603, the control unit 201 determines whether data for requesting status data is received by the first communication unit 206 from the power supply apparatus 100 similarly to the process in step S507. If the first communication unit 206 receives the data for requesting the status data (YES in step S603), the flowchart proceeds to step S604. If the first communication unit 206 does not receive the data for requesting the status data (NO in step S603), the flowchart returns to step S603.

In step S604, the control unit 201 determines whether the communication device 400 is detected similarly to the process in step S502. If the communication device 400 is detected (YES in step S604), the flowchart proceeds to step S605. If the communication device 400 is detected (NO in step S604), the flowchart proceeds to step S608.

In step S605, the control unit 201 determines whether the communication device 400 is capable of using wireless power supply similarly to the process in step S503. If the communication device 400 is capable of using wireless power supply (YES in step S605), the flowchart proceeds to step S608. If the communication device 400 is not capable of using wireless power supply (NO in step S605), the flowchart proceeds to step S606.

In step S606, the control unit 201 controls the display unit 214 to display warning data similarly to the process in step S504. Thereafter, the flowchart proceeds to step S607.

In step S607, the control unit 201 controls the first communication unit 206 to transmit third status data in response to the data received from the power supply apparatus 100 in step S603. Thereafter, the flowchart is terminated. The third status data is data for causing the power supply apparatus 100 to determine that power supply is not available for the electronic device 200, and is data indicating the presence of the communication device 400. For example, the third status data includes data indicating that there is no required power requested to the power supply apparatus 100. Thereafter, the flowchart is terminated.

If the power supply apparatus 100 receives the third status data transmitted from the first communication unit 206 to the power supply apparatus 100 in step S607, it is determined that power supply to the electronic device 200 is not available (NO in step S405). Thereafter, the power supply apparatus 100 controls the power supply unit 102 not to output the supplying power.

In step S608, the control unit 201 determines whether the battery 211 is required to be charged similarly to the process in step S508. If it is determined that the battery 211 is not required to be charged (NO in step S608), the flowchart proceeds to step S607. If it is determined that the battery 211 is required to be charged (YES in step S608), the flowchart proceeds to step S609.

In step S609, the control unit 201 controls the first communication unit 206 to transmit second status data in response to the data received from the power supply apparatus 100 in step S603 similarly to the process in step S510. Thereafter, the flowchart proceeds to step S610.

In step S610, the control unit 201 controls the charging unit 210 to charge the battery 211 using power supplied from the regulator 208 to the charging unit 210 similarly to the process in step S511. Thereafter, the flowchart returns to step S603.

In this way, when the electronic device 200 according to the second embodiment is connected with the communication device 400 which is not capable of using wireless power supply, the electronic device 200 transmits the data indicating that the electronic device 200 does not require power supply, to cause the power supply apparatus 100 to determine that power supply is not available for the electronic device 200. Accordingly, while the electronic device 200 is connected with the communication device 400 which is not capable of using wireless power supply, the electronic device 200 may control the power supply apparatus 100 not to supply the supplying power to the electronic device 200 or the communication device 400.

Furthermore, since the electronic device 200 notifies the power supply apparatus 100 and the user about the presence of the communication device 400 which is not capable of using wireless power supply, the power supply apparatus 100 and the user may recognize the reason why the supply of the supplying power to the electronic device 200 may not be started.

Accordingly, even if the communication device 400 is connected with the electronic device 200, the electronic device 200 may cause wireless power supply to be properly performed from the power supply apparatus 100 to the electronic device 200.

It is assumed that, with the electronic device 200 according to the second embodiment, the configuration and process similar to those of the first embodiment have effects similar to those of the first embodiment.

In step S607, the control unit 201 controls the first communication unit 206 to transmit the third status data in response to the data received from the power supply apparatus 100 in step S603. However, it is not limited thereto. For example, in step S607, the control unit 201 may control the first communication unit 206 not to transmit the response data in response to the data received from the power supply apparatus 100 in step S603, to the power supply apparatus 100. In this case, the third status data is not transmitted from the first communication unit 206 to the power supply apparatus 100. Owing to this, since the power supply apparatus 100 may not receive the status data from the electronic device 200, it is determined that power supply to the electronic device 200 is not available (NO in step S405). Thereafter, the power supply apparatus 100 controls the power supply unit 102 not to output the supplying power. Owing to this, for example, in step S607, the control unit 201 may transmit data for notifying about the presence of a foreign object as the data indicating the presence of the communication device 400 which is not capable of using wireless power supply.

In the first and second embodiments, the power supply apparatus 100 supplies supplying power to the electronic device 200 using the power supply antenna 107, and performs communication between the communication unit 106 and the electronic device 200 using the power supply antenna 107. However, the first and second embodiments are not limited to this. For example, the power supply apparatus 100 may separately have an antenna for supplying the supplying power to the electronic device 200 and an antenna for performing communication between the communication unit 106 and the electronic device 200.

Furthermore, in the first and second embodiments, the electronic device 200 receives power from the power supply apparatus 100 using the power receiving antenna 203, and performs communication between the communication unit 100 and the first communication unit 206 using the power receiving antenna 203. However, the first and second embodiments are not limited to this. For example, the electronic device 200 may separately have an antenna for receiving power from the power supply apparatus 100 and an antenna for performing communication between the power supply apparatus 100 and the first communication unit 206.

Note that, although the communication unit 106 functions as a reader/writer and the first communication unit 206 and the second communication unit 401 function as tags in the description above, the first and second embodiments are not limited to this. For example, the communication unit 106, the first communication unit 206, and the second communication unit 401 may function as P2P (Peer To Peer). Furthermore, the communication unit 106 and the first communication unit 206 may function as P2P and the second communication unit 401 may function as a tag, for example.

Note that, although the power supply unit 102 and the power receiving unit 202 conform to the magnetic field resonance method in the foregoing description, the first and second embodiments are not limited to this. The power supply unit 102 and the power receiving unit 202 may conform to a power supply method different from the magnetic field resonance method.

Furthermore, although the communication unit 106, the first communication unit 206, and the second communication unit 401 perform communication conforming to the NFC standard in the first and second embodiments, the first and second embodiments are not limited to this. The communication unit 106, the first communication unit 206, and the second communication unit 401 may perform communication conforming to ISO/IEC 18092 standard instead of the communication conforming to the NFC standard. The communication unit 106, the first communication unit 206, and the second communication unit 401 may perform communication conforming to ISO/IEC 14443 standard instead of the communication conforming to the NFC standard. The communication unit 106, the first communication unit 206, and the second communication unit 401 may perform communication conforming to ISO/IEC 21481 standard instead of the communication conforming to the NFC standard. The communication unit 106, the first communication unit 206, and the second communication unit 401 may perform communication conforming to RFID (Radio Frequency Identifier) instead of the communication conforming to the NFC standard.

Third Embodiment

At least one of the various functions, processes, and methods described in the first and second embodiments can be achieved using a program. Hereinafter, in a third embodiment, a program for realizing at least one of the various functions, processes, and methods described in the first and second embodiments will be referred to as a "program X". Further, in the third embodiment, a computer for executing the program X will be referred to as a "computer Y". Examples of the computer Y include a personal computer, a microcomputer, and a central processing unit (CPU).

At least one of the various functions, processes, and methods described in the first and second embodiments can be realized by the computer Y executing the program X. In this case, the program X is supplied to the computer Y via a computer readable storage medium. A computer readable storage medium according to the third embodiment includes at least one of a hard disk device, a magnetic storage device, an optical storage device, a magneto-optical storage device, a memory card, a read only memory (ROM), and a random access memory (RAM). Further, the computer readable storage medium according to the third embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all such modifications and equivalent structures.

This application claims priority from Japanese Patent Application No. 2014-119996, filed Jun. 10, 2014, which is hereby incorporated by reference herein in its entirety.

What is claimed is:

1. An electronic device comprising:
   a power receiver that wirelessly receives power from a power supply apparatus;
   a first communicator;
   a connection interface that connects a detachable communication device to the electronic device, wherein the detachable communication device includes a second communicator that performs wireless communication; and
   a CPU that (a) determines whether the detachable communication device that is currently connected is capable of using a wireless power supply from the power supply apparatus, if the detachable communication device and the connection interface are connected, and (b) controls the first communicator to transmit data for notifying the power supply apparatus that the detachable communication device that is currently connected is not capable of using the wireless power supply if the detachable communication device that is currently connected is not capable of using the wireless power supply.

2. The electronic device according to claim 1, wherein if the detachable communication device that is currently connected is not capable of using the wireless power supply, the CPU causes a display device to display information for notifying that the wireless power supply is not performed.

3. The electronic device according to claim 1, wherein if the detachable communication device is not capable of using the wireless power supply, the CPU causes a display device to display information for notifying that the detachable communication device that is currently connected is removed from the electronic device.

4. The electronic device according to claim 1, wherein a communication protocol of the first communicator corresponds to a protocol of the second communicator.

5. The electronic device according to claim 1, wherein a communication protocol of the first communicator conforms to Near Field Communication (NFC) standard.

6. The electronic device according to claim 1, wherein if the detachable communication device and the connection interface are connected, the CPU obtains data relating to the detachable communication device that is currently connected from the detachable communication device, and
   wherein the CPU determines whether the detachable communication device that is currently connected is capable of using the wireless power supply by using the data relating to the detachable communication device that is currently connected.

7. The electronic device according to claim 1, wherein the detachable communication device performs a predetermined authentication using the second communicator.

8. The electronic device according to claim 1, wherein the detachable communication device performs an electronic payment using the second communicator.

9. The electronic device according to claim 1, wherein the detachable communication device acts as at least one of a memory card and a SIM (subscriber identity module) card.

10. The electronic device according to claim 1, the power supply apparatus includes:
    a power supplier that wirelessly supplies power;
    a communicator that performs wireless communication with the electronic device; and a CPU that performs a process of limiting the wireless power supply to the electronic device if the communicator receives data for notifying the power supply apparatus that the detachable communication device that is currently connected is not capable of using the wireless power supply.

11. A method of controlling an electronic device comprising:

determining whether a detachable communication device is capable of using a wireless power supply if the detachable communication device is connected with a interface to the electronic device, wherein the electronic device includes a power receiver that wirelessly receives power from a power supply apparatus, a first communicator that performs wireless communication, and the connection interface that connects the detachable communication device to the electronic device, the detachable communication device including a second communicator that performs wireless communication; and controlling the first communicator to transmit data for notifying the power supply apparatus that the detachable communication device that is currently connected is not capable of using the wireless power supply if the detachable communication device that is currently connected is not capable of using the wireless power supply.

12. A non-transitory storage medium that stores a program for causing a computer to perform a method of controlling an electronic device, the method comprising:

determining whether a detachable communication device is capable of using a wireless power supply of the power supply apparatus if the detachable communication device is connected with a connection interface to the electronic device, wherein the electronic device includes a power receiver that wirelessly receives power from a power supply apparatus, a first communicator that performs wireless communication, and the connection interface that connects the detachable communication device to the electronic device, the detachable communication device including a second communicator that performs wireless communication; and controlling the first communicator to transmit data for notifying the power supply apparatus that the detachable communication device that is currently connected is not capable of using the wireless power supply if the detachable communication device that is currently connected is not capable of using the wireless power supply.

* * * * *